(12) United States Patent
Lamplough

(10) Patent No.: US 7,730,526 B2
(45) Date of Patent: Jun. 1, 2010

(54) MANAGEMENT OF PHYSICAL SECURITY CREDENTIALS AT A MULTI-FUNCTION DEVICE

(75) Inventor: Jeremy Lamplough, Valley Heights (AU)

(73) Assignee: Canon Information Systems Research Australia Pty Ltd., North Ryde (AU)

( * ) Notice: Subject to any disclaimer, the term of this patent is extended or adjusted under 35 U.S.C. 154(b) by 1016 days.

(21) Appl. No.: 11/421,170

(22) Filed: May 31, 2006

(65) Prior Publication Data

US 2006/0277599 A1 Dec. 7, 2006

(30) Foreign Application Priority Data

Jun. 1, 2005 (AU) ............................. 2005202405

(51) Int. Cl.
 G06F 7/04 (2006.01)
 G06F 21/00 (2006.01)
(52) U.S. Cl. .................. 726/9; 726/20; 713/185; 380/51
(58) Field of Classification Search ............. 726/5, 726/9, 18, 20; 713/182, 186; 380/51
 See application file for complete search history.

(56) References Cited

U.S. PATENT DOCUMENTS

| | | | |
|---|---|---|---|
| 4,993,068 A | 2/1991 | Piosenka et al. | |
| 5,606,609 A | 2/1997 | Houser et al. | |
| 6,202,151 B1 | 3/2001 | Musgrave et al. | |
| 6,615,264 B1* | 9/2003 | Stoltz et al. | 709/227 |
| 7,536,722 B1* | 5/2009 | Saltz et al. | 726/20 |
| 2002/0053035 A1* | 5/2002 | Schutzer | 713/202 |
| 2003/0012415 A1 | 1/2003 | Cossel | |
| 2003/0105849 A1 | 6/2003 | Iwamoto et al. | |
| 2004/0015702 A1* | 1/2004 | Mercredi et al. | 713/182 |
| 2006/0001898 A1* | 1/2006 | Maeshima et al. | 358/1.14 |
| 2006/0033958 A1* | 2/2006 | d'Entrecasteaux | 358/1.16 |

FOREIGN PATENT DOCUMENTS

| | | |
|---|---|---|
| EP | 1 462 982 | 9/2004 |
| WO | WO 00/25475 | 5/2000 |

* cited by examiner

Primary Examiner—Gilberto Barron, Jr.
Assistant Examiner—Virginia Ho
(74) Attorney, Agent, or Firm—Fitzpatrick, Cella, Harper & Scinto

(57) ABSTRACT

Disclosed is a method and apparatus for registering physical security credentials of a user at a device (150) forming part of a networked computer system (100). The method detects (122, 301) user identifying information from physical security credentials presented by the user at the device. The device then determines (302) whether the detected identifying information exists at a reference location (135). If the identifying information does not exist in reference location, authentication of the read identifying information for the user is performed by associating the identifying information with a username and password (140) entered by the user at the device. The reference location is then updated with the authenticated identifying information corresponding to the user.

22 Claims, 5 Drawing Sheets

MANAGEMENT OF PHYSICAL SECURITY CREDENTIALS AT A MULTI-FUNCTION DEVICE

CROSS-REFERENCE TO RELATED PATENT APPLICATIONS

This application claims the right of priority under 35 U.S.C. §119 based on Australian Patent Application No. 2005202405, filed Jun. 1, 2005, which is incorporated by reference herein in its entirety as if fully set forth herein.

FIELD OF THE INVENTION

The present invention relates generally to scanning and/or reproduction devices and has particular application to Multi-function Devices (MFDs) which integrate two or more of facsimile, scanner, copier and printer functions. In particular the present invention relates to improved methods of managing security information for users at the scanning and/or reproduction device.

BACKGROUND

Multi-Function Devices (MFDs) is a name given to that family of products that integrate facsimile, scanner, copier and printer functions in a single device. MFDs have become commonplace in the modern office environment, and also in the so-called "home office".

In a networked office environment, a document may have its printing instigated from a personal computer in one location in the network, and the printing performed by an MFD at another location in the network. Users often wish to prevent un-authorised viewing of confidential documents prior to the user arriving at the MFD to retrieve their hard-copy printout. Many MFDs incorporate a secure print feature which commences the print job only when the sender arrives at the print device and is subsequently authenticated.

Many MFDs also have advanced scan and send functionality, allowing users to email, fax, or store documents on remote server locations such as document management systems. To ensure network security and prevent unauthorised viewing of confidential information, it is important that the user be authenticated at the MFD.

Many organisations perform cost recovery of resources such as paper and toner, or they limit the amount or types of copying and printing users can perform. Authentication of users at the MFD allows resource usage to be tracked or limited.

For these reasons, many MFDs provide a means of authenticating a user of the MFD prior to particular functionality being enabled.

The usual approach to authentication on most networked devices is through a username and password combination. Since most users of the network have a username and password assigned in order to access their personal computers on the network, using the same username and password to access other networked device can be simple to administer.

However a username-password combination is very inconvenient for user authentication at an MFD, due to the limited keystroke input capabilities and the public location of these devices. Users will generally be authenticating themselves many times throughout the day and only staying authenticated for short periods of time (e.g. 5 minutes or less) whilst they collect their secure print jobs or perform their required functions.

For this reason a physical card, token or something on or carried by the user is preferred for authentication at the MFD. This allows users to quickly authenticate themselves at the device. An example is a building access card which is carried by many office workers to access the office premises.

Currently, if a user wishes to use physical credentials for authentication at the MFD, a Systems Administrator of the office network must first setup the system to include their credentials prior to their use. This greatly increases network administration workload. Whilst the term "credentials" is plural, in the context of the present specification, such may be embodied by a single card or token, sufficient to authenticate the user at the MFD. Also, physical credential systems such as building access systems are not normally designed to be network accessible, making it difficult for them to provide authentication at the MFD. For example, building access cards are often issued by a different organisation (the organisation that manages the building services), from that organisation responsible for network security.

The Systems Administrator's workload is also increased if an organisation wishes to implement a new MFD authentication system using existing physical security credentials. If the users are in many different remote offices with different security systems, it may be difficult to obtain all the information from the security systems in order to provide accounts for all users wishing to access the system.

A method which allows fast and simple authentication at the device using physical credentials without the increasing system administration workload or complexity is needed.

SUMMARY OF THE INVENTION

In accordance with one aspect of the present invention there is disclosed a method for registering physical security credentials of a user at a device forming part of a networked computer system, said method comprising the steps of:

detecting user identifying information from physical security credentials presented by the user at the device;

determining whether the detected identifying information exists at a reference location;

if identifying information does not exist in reference location, authenticating the identifying information for the user by associating the identifying information with data entered by the user at the device; and updating the reference location with the authenticated identifying information corresponding to the user.

The reference location may comprise a server forming part of the network and being in communication with the device or may be formed within the device. The physical security credentials may comprise an access card, be biometric, be a magnetic strip card or anything carried by the user such as a cellular telephone, personal digital assistant (PDA) or Radio Frequency Identification tag. A PIN may be assigned to the user during the authenticating.

Where the device comprises a printer, the method may further include assigning a printing priority within the network based on the identification of the user. Alternatively or additionally the method may comprise the pre-emptive step of assigning access rights of a first user to a second user thereby permitting, after execution of the remaining steps of the method, the second user to operate the device in place of the first user.

In accordance with another aspect of the present invention there is disclosed a method of managing use of a reproduction device, said method comprising the steps of:

(a) authenticating a user at the reproduction device using a form of authentication;

(b) detecting input from the user to alter the form of authentication; and (c) updating a record of the form of authentication at a reference location with alterations arising from step (b).

The form of authentication may comprises physical security credentials associated with the user, and the altering of the physical security credentials comprises one of a modification of, addition to, or a deletion from the security credentials authenticated in step (a), said authenticating comprising checking the presented security credentials against those retained at the reference location.

In accordance with another aspect of the present invention there is disclosed apparatus connectable as part of a networked computer system, said apparatus comprising:

at least one reader adapted to read identifying information from physical credentials presented by a user at the apparatus;

an interface by which data may be entered to said apparatus by the user;

a processor arrangement coupled to the reader, the interface and the computer network for:

(i) determining whether the detected identifying information exists at a reference location, and if such does not exist, authenticating the identifying information for the user by associating the identifying information with a username and password entered by the user via the interface; and (ii) updating the reference location with the authenticated information corresponding to the user.

Desirably the apparatus further comprises a sub-system the operation of which is enabled by the processor arrangement as a consequence of the determined existence of the read identifying information at the reference location.

Other aspects of the invention are also disclosed.

BRIEF DESCRIPTION OF THE DRAWINGS

At least one embodiment of the present invention will now be described with reference to the drawings, in which.

DETAILED DESCRIPTION INCLUDING BEST MODE

In the modern office environment, employees need access to facilities to copy, print or scan paper documents. Because of the cost savings and ease of administration provided by MFDs when compared separate printers, scanners and copiers, many offices have deployed MFDs throughout their premises. These devices are generally located in places that are easily accessible and so they provide an excellent place for users to manage their security credentials. Instead of users having to contact their System's Administration to change their information they can do it at the MFD. A reader attached to an MFD can be used not to merely authenticate the user at the MFD, but also to allow the user to manage their security information at the MFD.

Figure 1:
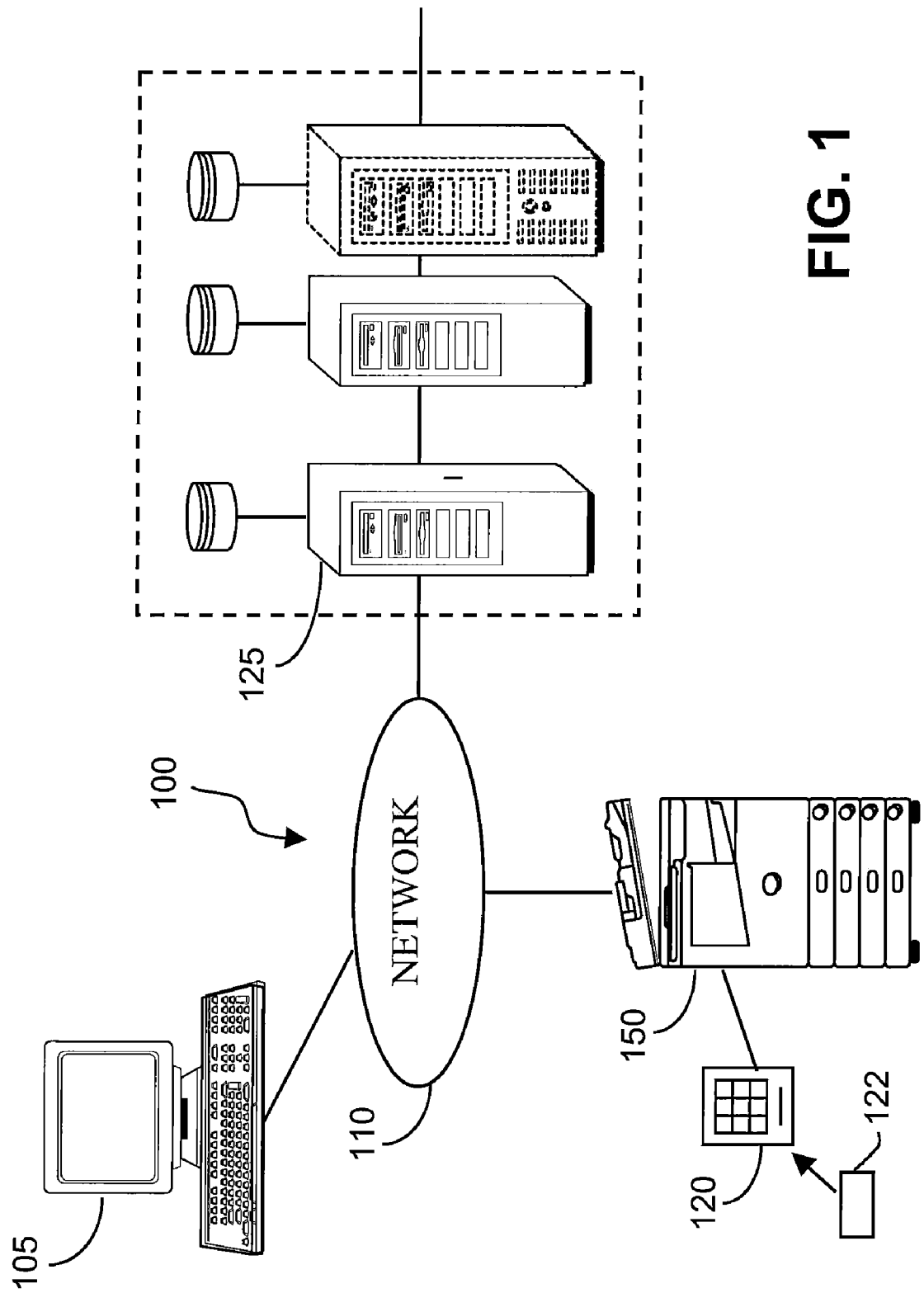
FIG. 1 is a schematic representation of a networked environment containing MFDs and networked services.

FIG. 1 shows a computing system 100 which contains a Multi-Function Device (MFD) 150, a computer workstation 105 and a variety of servers 125, all of which being connected via a Local Area Network (LAN) 110 such as an intranet or internet or similar networking technology. The servers 125 contain capabilities for performing network based activities, such as user authentication, document storage, file and print management and personal contacts management. Examples of server applications which provide user authentication capabilities are Microsoft™ Active Directory, manufactured by Microsoft Corp. or Novell Netware™ manufactured by Novell, Inc both of the USA. An example of a server application that may provide personal contacts management is Microsoft Exchange™. In addition to these examples, there are many other products that provide the same or similar capability. These capabilities may be provided by one server or they may be provided by a range of interconnected servers, as illustrated.

Connected to the MFD 150 is an input device 120 which allows the user to provide or otherwise enter their physical security information. The device 120 can be any identity sensor which can be used to read or otherwise access unique identifying information of the user. Examples of these sensors are proximity card readers, magnetic strip card readers or biometric sensors, such as a fingerprint reader. These sensors can be attached to or integrated with the MFD 150 at manufacture, or provided as a stand-alone device which may be attached to the MFD 150 using standard well known interfaces. In the preferred implementation, the sensor is a proximity card reader 120 configured to read user's credentials from a proximity tag device 122, such as an access card, for example carried by the user.

A user can logon to the workstation 105 and access the network 110, with the access to the network resources being controlled by one or more of the servers 125. This server 125 provides standard network authentication corresponding to that discussed in the Background section of this document. Once authenticated onto the network 110, the user can access the network resources and can send print jobs to the MFD 150.

Figure 2:
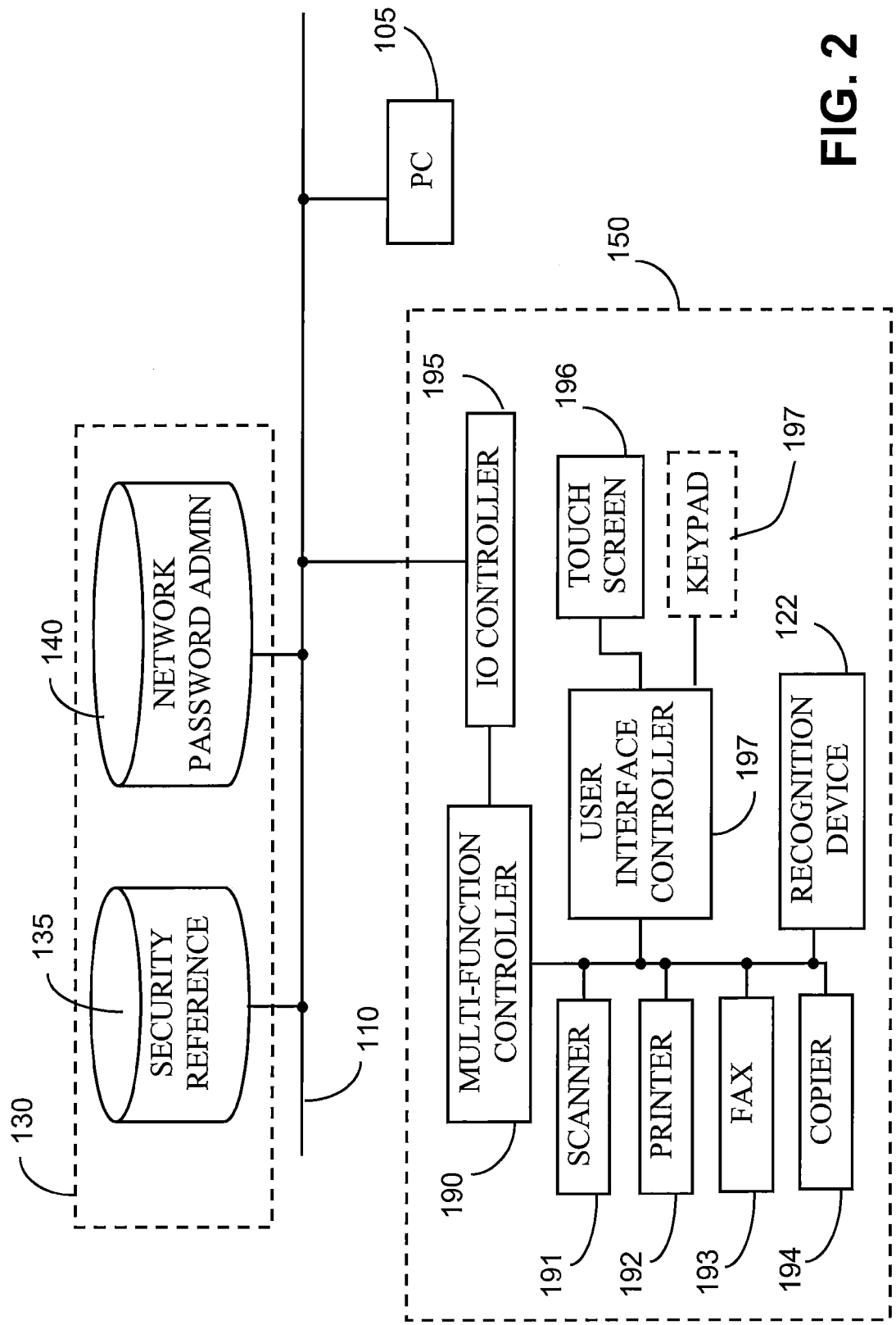
FIG. 2 is a view similar to FIG. 1 but of the MFD in greater detail and its associated components.

FIG. 2 shows a preferred implantation of the MFD 150 and network 110 in more detail. At least one or more of a scanner 191, printer 192, fax 193, or copier 194 are connected to a multi-function controller 190 to each form part of the MFD 150. The connection can be either a proprietary connection or a standard connection such as a SCSI interface. Connected to the multi-function controller 190 is an IO controller 195 which handles Input/Output functionality such as access to the network 110. Also connected is a user interface controller 195 which handles display and user input via a touch screen 196. A recognition device 122 is used for reading a user's physical security credentials at the MFD 150 and implements to input device 120 of FIG. 1. A variety of access services 130 are shown and are accessible from the MFD 150 over the network 110 and which are typically implemented as applications and/or hardware upon the servers 125. A security reference 135, being one of the services 130, contains security reference information such as usernames and passwords, biometric keys, card access numbers. The information in the security reference 135 is accessible by the MFD 150. A network password administration 140, being another of the services 130, contains usernames and passwords which can be used for network access. The services 135 and 140 may be combined upon the same server 125 if desired. The workstation computer 105 can access the network 110 using network security information stored in the network password administration server application 140.

Figure 3:
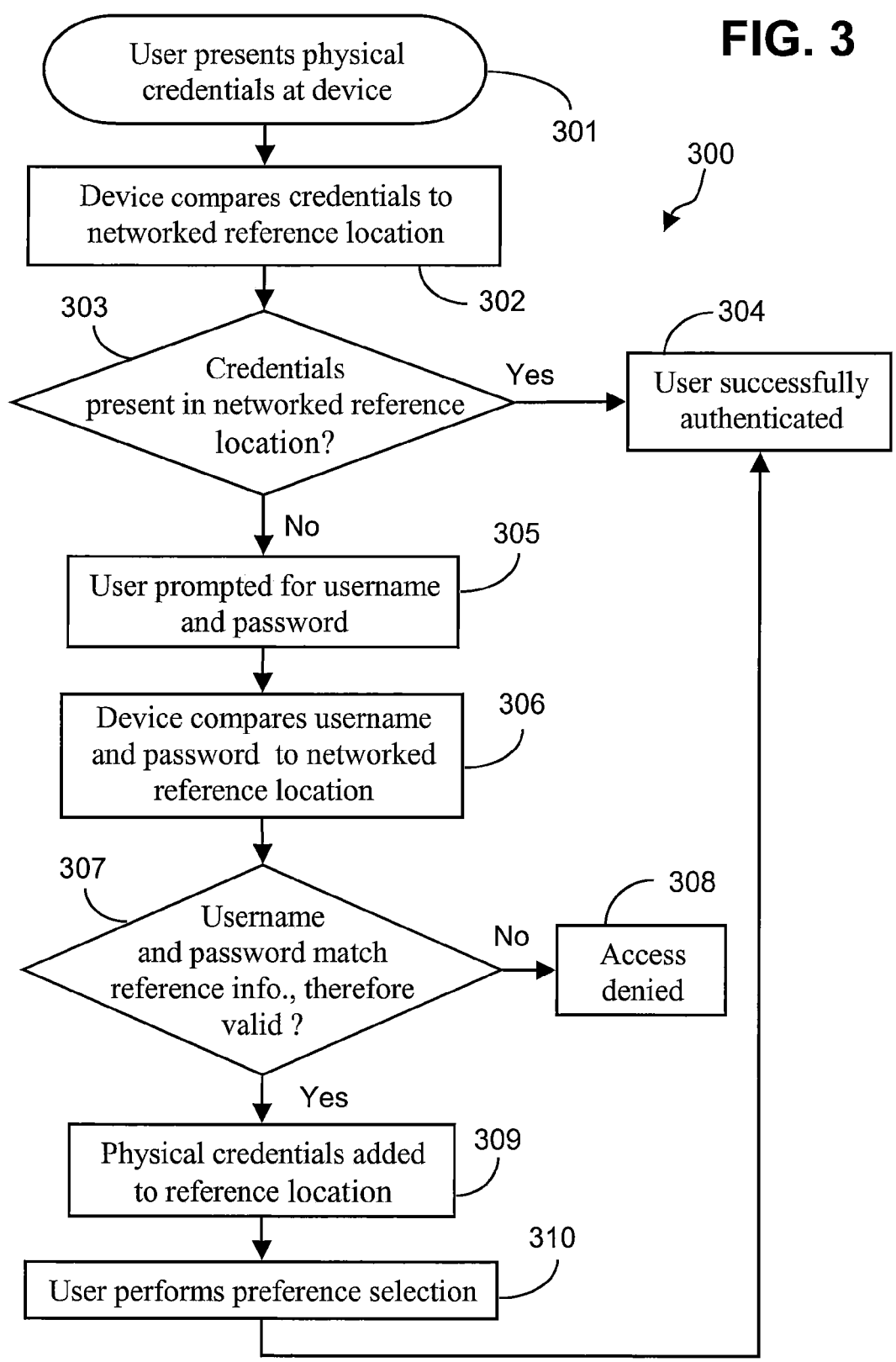
FIG. 3 is a flowchart showing the steps that a user can use to register their physical security credentials at the MFD.

FIG. 3 shows a method 300 of user authentication implemented at the MFD 150. Initially, the user physically arrives at the MED 150 and presents their physical credentials at the device 150 for authentication, the reading of the credentials being performed at step 301. An example of this is a swiping of the user's identification badge at the recognition device 122 attached to the MFD 150 or pressing their finger on a finger print reader attached to the MFD 150. At step 302, the MFD 150 compares the user identification information to stored reference information. The user identification information may take different forms depending on the physical credentials presented by the user. For example, the information may be a card number if an access card is being used. Alternatively, the information may be formed by or sourced from a biometric key if a biometric reader is being used. The format of the information is not important, as long as it can be compared against previously stored reference information. This reference information is preferably stored at a location accessible on the network 110. Alternatively, the reference information may be stored upon on the MFD 150 itself, for example in non-volatile semiconductor memory or (non-volatile) disk memory. The location of this information is not critical, provided that it is accessible by the MFD 150. The comparison of the identification credentials read by the recognition device 122 may involve a secure (encrypted) approach, for example according the well known technique of 'One-Way-Hashing'.

In step 303 the MFD 150 compares the credentials provided by the user to that stored as reference information. If they match, the user is then successfully authenticated according to step 304. The user may also be prompted to provide a Personal Identification Number (PIN) or password as well as their physical credentials. This, for example, may be entered via the touch screen 196, or using an optional numerical keypad 197, such as often found on multi-function devices. Once authenticated, the user can access the network resources or the functionality of the MFD 150 appropriate to their defined level of access.

If the credentials provided by the user are not contained in the reference information, the method 300 goes to step 305 where the user is asked to provide a different form of authentication such as username and password. The username and password is an alternative form of authentication. The username and password are generally the same as that used by the user to logon to the network from the workstation 105. The username and password may be entered onto the touch screen 196 or some other input device provided by the MFD 150.

Once the user has entered their username and password, the MFD 150 compares the provided information with that stored in a reference location. In the preferred implementation, the reference location is a network accessible LDAP server being one of the servers 125. This is shown in step 306 and the comparison may include encryption such as one-way-hashing and other standard techniques. These techniques are well known and are standard mechanisms for authenticating a user onto a networked device.

In step 307, if the username and password provided by the user in step 305 match the reference information, the MFD 150 has successfully authenticated the user. The physical credentials originally provided by the user can now be linked to an authenticated user. The reference location which was contacted by the MFD 150 in step 302 can be updated to include the physical credentials provided by the authenticated user, as shown in step 309. This means that the next occasion the user wishes to authenticate themselves they do not need to provide their username and password at the MFD. The user has therefore self-registered their physical security credentials at the MFD 150 using their network logon credentials.

In the preferred implementation, the network authentication is provided by a LDAP compliant server such as Microsoft Active Directory™. The physical credential reference information is also stored in the same location. By providing their username and password, the system 100 allows the user to update their own account without the need for action by a Systems Administrator of the system 100.

It may be possible for a user to have more than one set of credentials stored as part of their account. For example, travelling users may have two or more building passes which they can use. Both of these may be stored against their account in the reference location. This enables the system 100 to authenticate them in both locations without the need to re-register.

Credentials may also be limited, after which the corresponding user is no longer registered. For example, temporary building access cards may have a predetermined 12 hour time limit on them. Temporary building access cards are often issued to persons who have forgotten their own access cards or people travelling from other office locations. A temporary card can then be issued to a user who registers it against their account using the scenario described in FIG. 3. At the end of the day, the card is automatically deregistered by the system 100. This ensures that when the card is re-issued to a new user, it does not provide access to the previous user's account. Other time period may be prescribed.

In step 308, if the user has not provided a correct username and password, they are denied access to the system.

During the process of registering their credentials, the user may optionally select preference information at step 310. One of the preferences the user may choose is to assign a PIN to their account. A PIN provides a greater level of security than just physical credentials and is simple and quick to enter at the MFD 150 since most MFDs have a key pad incorporating numerical keys, for example implemented via the touch screen 196, or as the optional independent keypad 197.

If the MFD is providing secure printing functionality, during the process of credential registration, users may give permission to other users (such as their personal assistants) to collect their secure print jobs. This allows a manager to print a document to the MFD 150 and have their assistant authenticate themselves at the MFD 150 and collect the print job. When the manager's assistant is authenticated at the MFD 150, the assistant have will then have access to their manager's document.

During the process of registering security credentials for the system 100, permissions and access control rights may be assigned. For example, if the user is a manager, their print jobs may have a higher priority than someone who isn't a manager. Further, they may be allowed to print and copy in colour, or fax long-distance, whereas other users do not have these permissions. In the preferred implementation, these permissions are automatically determined by the system 100 utilising the information stored in a corporate directory residing upon the servers 125.

Figure 4:
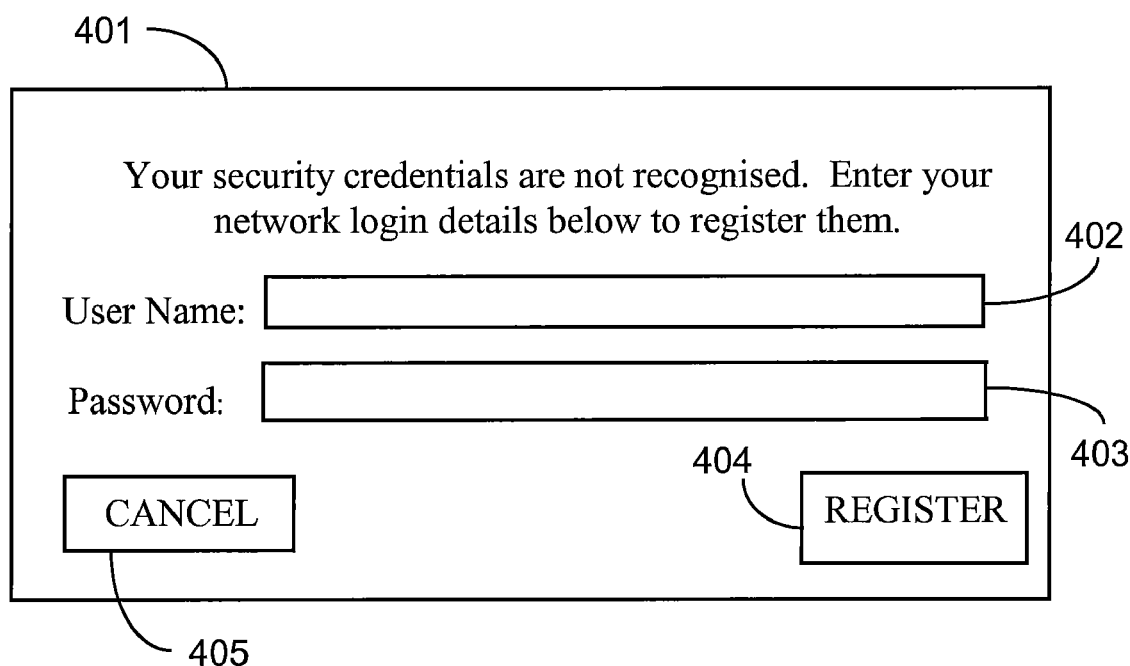
FIG. 4 is a representation of a display screen image that may be used at the MFD to register a user's physical security credentials.

FIG. 4 shows an example of a user interface display 401 which may be represented upon the touch screen 196 of the MFD 150 to allow the user to register their security credentials. The display 401 is a dialog box which is displayed to the user when the user has presented their credentials and which are determined by the MFD 150 as not being contained in the reference location. In the preferred implementation, the dialog 401 would be displayed by the MFD 150 as part of step 305. If the user wishes to register their credentials at the MFD 150, they enter their user name in a box 402, and their password into a box 403. The user may then select a Register button 404. If they do not wish to register their credentials the user can press a Cancel button 405. This is an example interface design. The layout is not important as long as it allows the user to enter their username and password.

Figure 5:
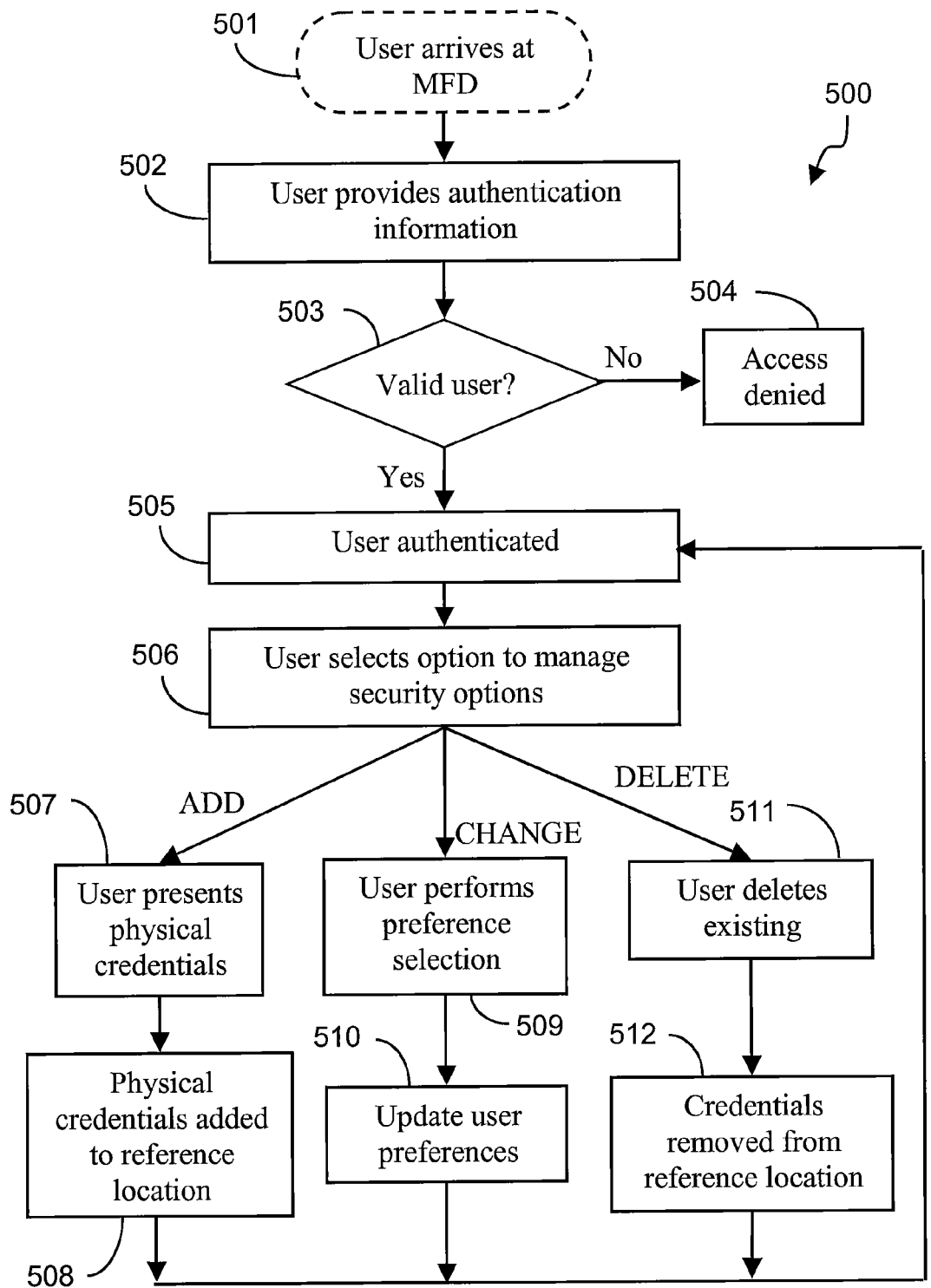
FIG. 5 is a flowchart showing the steps that a user can perform to manage their physical security credentials at the MFD.

FIG. 5 is an alternative method 500 executed at the MFD 150 for allowing a user to manage their security credentials at the MFD 150. In the method 500, the user is authenticated manually and then once authenticated they are able to manage their credentials.

Initially, at 501, the user arrives at the MFD 150 which requires authentication in order to provide some of its functionality.

At step 502 the MFD 150 detects the provision by the user of some form of security credentials which allows the user to be authenticated by the MFD 150. In the preferred implementation this would be their username and password and would be the same as their network login. Alternatively this may involve provision of some form of physical credentials if some bad been previously registered. In step 503 the MFD 150 compares the security information to that retained at a reference location, for example within the servers 125. In the preferred implementation, the MFD 150 compares a username and password provided by the user to that stored in a network accessible location such as an LDAP server. The MFD 150 is able to authenticate the user using the supplied credentials. If the credentials do not correspond to a valid user, the user is denied access in step 504.

Once the user is authenticated in step 505, the user has the option to manage their physical credentials in step 506. In the preferred implementation the user would be able to press an iconic button on the touch screen 196 of the MFD 150 which would take them to a management display screen, also represented upon the touch screen 196. However another possibility is that the first time a user logs in at the MFD 150, the user is automatically presented with the management screen. 'Management' of the user's physical credentials includes, but isn't limited to, any or all of adding, deleting or modifying physical access credentials. As previously discussed, these credentials could be a building access card, smart card, biometric key or some other form of input. If the user selects an 'ADD' option, step 507 is implemented to read any physical credentials then presented by the user. Presentation of such credentials, could involve putting their finger over a biometric reader, or swiping an access card at an access card reader. The MFD 150 reads the presented information via the recognition device 122 from the physical credentials.

Once these credentials have been read by the MFD 150, they are stored in a reference location at step 508. This reference location may be local to the MFD 150 or in a network accessible location, such as on the servers 125. In the preferred implementation, the credentials are stored in a network accessible location such as an LDAP server and in such a way that they can be accessed to authenticate a user at the MFD 150. This storage may involve encryption, for example the well known technique of 'One Way Hashing'. During the process of registering these credentials, the user may also assign a PIN. This ensures that the user is authenticated using something they physically have along with something they know.

Along with adding new physical security information, the system also allows the user to modify existing information or preferences. Where the user selects at step 506 an option to change an existing option related to their security information, step 509 is them implemented. For example, the user may wish to add, delete or modify a PIN on their account. Alternatively, on a system that is providing secure printing functionality, the user may wish to add certain people as having privileges to access their print jobs at the MFD 150. This allows an assistant to print documents on behalf of their manager.

The modifications made to the user's security information are then updated in step 510. The location in which the modified information is stored is accessible by the MFD 150 whenever the user is authenticated. In the preferred implementation the modified security information is stored in a network accessible location such as an LDAP server. The addition of a PIN may also be done in the manner described for step 508 by the user in step 510 as a modification of their information.

If the user selects in step 506 the option to delete existing credentials, step 511 is implemented. The user may wish to do this for a variety of reasons. For example, the user may have been issued with a temporary building access card whilst the user was visiting a particular location. Prior to returning the card, the user may wish to delete it so that it can no longer be used to access their account. Once the user has selected the particular physical credentials to delete, the reference location is updated in step 512.

The physical credentials that are managed at the MFD 150 can also be used for other authentication purposes. For example, a user may register a biometric key at the MFD 150. This information may be stored in a network accessible location. This location could be then contacted by another security mechanism, such as an access door. Once registered, this biometric key may then be used to access secured building locations.

The processes of the MFD 150 are preferably implemented as software, such as one or more application programs executing within the MFD 150. For example the application programs may be stored in read-only-memory (ROM) forming a part of or adjunct to the multi-function controller 190. In particular, the steps of the methods 300 and 500 are effected by instructions in the software that are carried out by the multifunction controller 190. The instructions may be formed as one or more code modules, each for performing one or more particular tasks. The software may also be divided into two separate parts, in which a first part performs the authentication methods and a second part manages a user interface between the first part and the user. The user interface parts may operate in conjunction with the user interface controller 195 to effect appropriate display of information upon the touch screen 196 and to receive user commands from one or both of the touch screen 196 and keypad 197. The software may be stored in a computer readable medium, such as a ROM, flash RAM or permanent memory, for example a magnetic disk drive forming part of or coupled to the multifunction controller 190. The software is loaded for execution into the multifunction controller 190 from the computer readable medium, and then executed by the multifunction controller 190. A computer readable medium having such software or computer program recorded on it is a computer program product. The use of the computer program product in the computer preferably effects an advantageous apparatus for user authentication at an MFD.

INDUSTRIAL APPLICABILITY

The arrangements described are applicable to the computer and data processing industries and particularly office environments where secure use of print devices is desired. Significantly, whilst the authentication procedures described above were based upon MFDs, such are also equally applicable to stand-alone, mono-function devices such as printers, scanners and facsimile machines and dual-function devices such as copiers. Accordingly the authentication procedures may be similarly applied to such devices.

The foregoing describes only some embodiments of the present invention, and modifications and/or changes can be made thereto without departing from the scope and spirit of the invention, the embodiments being illustrative and not restrictive.

I claim:

1. A method of authenticating identifying information for a user by associating the identifying information from physical security credentials with data entered at a reproduction device and receiving a job sent to the reproduction device from a workstation, the reproduction device and the workstation forming part of a networked computer system, said method comprising the steps of:
    detecting identifying information from the physical security credentials presented by the user at the reproduction device;
    determining whether the detected identifying information exists at a reference location;
    if the identifying information does not exist at the reference location, authenticating the identifying information for the user by associating the identifying information with data entered by the user at the reproduction device, the entered data comprising a username and password corresponding to those by which the user is able to access the networked computer system via the workstation used to send the job to the reproduction device; and
    updating the reference location with the authenticated identifying information corresponding to the user and receiving at the reproduction device the job sent from the workstation.

2. The method of claim 1, wherein the reference location comprises a server forming part of the network and being in communication with the device.

3. The method of claim 1, where the reference location is formed within the device.

4. The method of claim 1, where the physical security credentials comprise an access card.

5. The method of claim 1, where the physical security credentials are biometric.

6. The method of claim 1, where the physical security credentials comprise a magnetic strip card.

7. The method of claim 1, further comprising the step of:
    assigning a PIN to the user during said authenticating.

8. The method of claim 1, wherein said device comprises a printer, said method further comprising the step of:
    assigning a printing priority within the network based on the identification of the user.

9. The method of claim 1, wherein the step of detecting identifying information is preceded by the step of:
    assigning access rights of a first user to a second user, thereby permitting, after execution of the step of updating the reference location, the second user to operate the device in place of the first user.

10. The method of claim 1, wherein the authenticated identifying information is deleted from the reference location automatically after a predetermined period of time.

11. A method of managing use by a user of a reproduction device forming part of a networked computer system including a workstation operable by the user to send a job to the reproduction device for reproduction, said method comprising the steps of:
    (a) authenticating a user at the reproduction device using a form of authentication, said authenticating comprising;
        (1) detecting identifying information from physical security credentials presented by the user at the reproduction device;
        (2) determining whether the detected identifying information exists at a reference location within the networked computer system;
    (b) if the detected identifying information is determined not to exist at the
    reference location, detecting input from the user at the reproduction device to alter the form of authentication, the detected input comprising a username and password corresponding to those by which the user is able to access the networked computer system via the workstation to use the reproduction device; and
    (c) updating a record of the form of authentication at the reference location with alterations arising from step (b).

12. A method according to claim 11 wherein the altering of the form of authentication comprises one of a modification of, addition to, or a deletion from the physical security credentials authenticated in step (a), said authenticating comprising checking the presented physical security credentials against those retained at the reference location.

13. The method of claim 12 where the addition of the security credentials is performed if previously no registered credentials existed in the reference location.

14. The method of claim 12 where the addition of the security credentials adds new credentials to existing credentials previously retained at the reference location.

15. The method of claim 12 wherein the any newly added security credentials are valid for only a predetermined period of time.

16. An apparatus connectable as part of a networked computer system including at least a reproduction device and a workstation, said apparatus being locatable at the reproduction device and comprising:
    at least one reader adapted to read identifying information from physical credentials presented by a user at the apparatus;
    an interface by which data may be entered to said apparatus by the user;
    a processor arrangement coupled to each of the reader, the interface and the computer network for:
        (i) determining whether the read identifying information exists at a reference location within the computer network, and if the read identifying information does not exist at the reference location, authenticating the identifying information for the user by associating the identifying information with a username and password entered by the user via the interface, the username and password corresponding to those by which the user is able to access the networked computer system via the workstation from which a job is sent to the reproduction device for reproduction; and
        (ii) updating the reference location with the authenticated information corresponding to the user and enabling reproduction by the reproduction device of the job sent by the user from the workstation.

17. The apparatus according to claim 16, further comprising:
    a sub-system the operation of which is enabled by the processor arrangement as a consequence of determining the existence of the read identifying information at the reference location.

18. The apparatus according to claim 17, wherein said sub-system comprises at least one of a scanner, a printer, a facsimile, and a copier.

19. The apparatus according to claim 16, wherein the reference location comprises a location within said apparatus.

20. The apparatus according to claim 16, wherein the reference location comprises a location within the networked computer system distinct from said apparatus.

21. A system comprising:
- an apparatus usable by a user, the apparatus forming part of a computer network including at least a workstation;
- an input device physically associated with said apparatus and configured to detect identifying information from physical security credentials presented by the user at the apparatus;
- means for determining whether the detected identifying information exists at a reference location within the computer network;
- means for authenticating the identifying information for the user, if the identifying information does not exist at the reference location, by associating the identifying information with data entered by the user at the apparatus, the entered data comprising a username and password corresponding to those by which the user is able to access the computer network via the workstation from which a job is communicated to the apparatus; and
- means for updating the reference location with the authenticated identifying information corresponding to the user and for causing communication of the job between the workstation and the apparatus.

22. A computer readable medium, having a program recorded thereon, where the program is configured to make a computer execute a procedure of authenticating identifying information for a user by associating the identifying information from physical security credentials with data entered at a reproduction device and of receiving a job sent to the reproduction device from a workstation, said reproduction device and said workstation forming part of a networked computer system, said program comprising:
- code means for detecting identifying information from the physical security credentials presented by the user at the reproduction device;
- code means for determining whether the detected identifying information exists at a reference location within the networked computer system;
- code means for authenticating the identifying information for the user, if the identifying information does not exist in the reference location, by associating the identifying information with data entered by the user at the reproduction device, the entered data comprising a username and password corresponding to those by which the user is able to access the networked computer system via the workstation used to send the job to the reproduction device; and
- code means for updating the reference location with the authenticated identifying information corresponding to the user and receiving at the reproduction device the job sent from the workstation.

* * * * *